(12) United States Patent
Saraiva et al.

(10) Patent No.: US 10,070,587 B2
(45) Date of Patent: Sep. 11, 2018

(54) CHAIN AND SLAT CONVEYOR AND METHOD OF ASSEMBLY

(71) Applicants: AGCO Corporation, Hesston, KS (US); AGCO do Brazil Comercio e Industria Ltda, Hesston, KS (US)

(72) Inventors: Daniel Saraiva, Sao Luiz-Canoas (BR); Glen Suffolk, Wichita, KS (US)

(73) Assignees: AGCO DO BRASIL SOLUÇÕES AGRICOLAS LTDA, Sau Paulo (BR); AGCO CORPORATION, Duluth, GA (US)

( * ) Notice: Subject to any disclaimer, the term of this patent is extended or adjusted under 35 U.S.C. 154(b) by 0 days.

(21) Appl. No.: 15/602,587

(22) Filed: May 23, 2017

(65) Prior Publication Data

US 2017/0339830 A1    Nov. 30, 2017

Related U.S. Application Data

(60) Provisional application No. 62/341,252, filed on May 25, 2016.

(51) Int. Cl.
| | |
|---|---|
| *A01D 61/04* | (2006.01) |
| *B65G 17/06* | (2006.01) |
| *A01D 61/00* | (2006.01) |
| *B65G 15/52* | (2006.01) |
| *B65G 17/44* | (2006.01) |
| *B65G 19/10* | (2006.01) |
| *B65G 19/24* | (2006.01) |

(52) U.S. Cl.
CPC .......... *A01D 61/04* (2013.01); *A01D 61/008* (2013.01); *B65G 15/52* (2013.01); *B65G 17/063* (2013.01); *B65G 17/067* (2013.01); *B65G 17/44* (2013.01); *B65G 19/10* (2013.01); *B65G 19/24* (2013.01)

(58) Field of Classification Search
CPC .... B65G 15/52; B65G 17/063; B65G 17/067; B65G 17/32; B65G 17/34; B65G 17/42; B65G 17/44; B65G 19/10; B65G 19/24; A01D 61/008; A01D 61/02; A01D 61/04
See application file for complete search history.

(56) References Cited

U.S. PATENT DOCUMENTS

| | | | | |
|---|---|---|---|---|
| 3,587,819 A | * | 6/1971 | Deakin .................... | B23Q 7/06 198/465.3 |
| 3,785,472 A | * | 1/1974 | Mathews ............... | A01D 61/04 198/493 |
| 3,967,719 A | * | 7/1976 | Kloefkorn ............ | A01D 61/008 198/550.12 |
| 5,369,833 A | * | 12/1994 | Uttke .................... | B65G 19/10 15/84 |

(Continued)

FOREIGN PATENT DOCUMENTS

| | | |
|---|---|---|
| GB | 1199317 A | 7/1970 |
| WO | 2011/138607 A2 | 11/2011 |

OTHER PUBLICATIONS

UK Intellectual Property Office, International Search Report for related UK Application No. GB1610382.2 dated Dec. 14, 2016.

*Primary Examiner* — Gene O Crawford
*Assistant Examiner* — Keith Campbell

(57) ABSTRACT

A chain and slat conveyor with first and second continuous chains and a plurality of slats. Each slat is connected to the first chain by a keyhole connection and to the second chain by a bolt or rivet which passes through a hole in the slat.

8 Claims, 3 Drawing Sheets

(56) References Cited

U.S. PATENT DOCUMENTS

| | | | | |
|---|---|---|---|---|
| 5,478,277 A | * | 12/1995 | Kloefkorn | A01D 61/008 460/114 |
| 7,473,168 B2 | * | 1/2009 | Day | A01D 61/04 460/16 |
| 8,596,447 B2 | * | 12/2013 | Gentz | A01D 61/008 198/731 |
| 8,701,870 B1 | * | 4/2014 | Farley | B60P 1/36 198/727 |
| 2013/0048473 A1 | * | 2/2013 | Gough | B65G 17/067 198/836.1 |

* cited by examiner

CHAIN AND SLAT CONVEYOR AND METHOD OF ASSEMBLY

CROSS-REFERENCE TO RELATED APPLICATION

The present application claims the benefit of and priority from U.S. provisional Application No. 62/341,252, filed May 25, 2016, the entire disclosure of which is hereby incorporated by reference.

BACKGROUND

Field of the Invention

The invention relates to chain and slat conveyors comprising first and second continuous chains and a plurality of slats secured thereto, and also to a method of assembling such.

Discussion of Related Art

Chain and slat conveyors are well known and have been employed in various applications for many years. One example application is the use of chain and slat elevators in combine harvesters, particularly inside the feederhouse for conveying a cut crop stream from a header in a generally rearward and upward direction into the processing apparatus. U.S. Pat. Nos. 3,785,472 and 7,473,168 disclose example chain and slat elevators, the content of which are incorporated herein by reference.

The assembly of chain and slat conveyors can be time consuming with the requirement for each slat to be secured to the chains. WO-2011/138607 discloses a slat-type conveyor belt which utilizes a connector to secure a slat to endless metal strips. The connecter projects through a hole in the metal strip to form a dovetail connection with a slat. Connected in this way the slats can move along their axes unless prevented by retaining sidewalls. This type of connection is thus unsuitable for operating in some situations, and especially at high speeds.

SUMMARY OF THE INVENTION

In accordance with a first aspect of the invention there is provided a chain and slat conveyor comprising first and second continuous chains and a plurality of slats, wherein each slat is connected to the first chain by a keyhole connection and to the second chain by a bolt or rivet which passes through a hole in the slat. By providing a keyhole connection to one chain the number of bolts required to secure each slat is substantially reduced thus reducing assembly time and component count.

The invention involves the recognition of the advantages of using keyhole connections for ease of assembly. On the other hand, keyhole connections can easily come apart with relative movement between two components connected thereby. By securing each slat to the second chain by a bolt or rivet such relative movement is prevented thus ensuring the integrity of the keyhole connection. Advantageously, the bolt/rivet connection in combination with the keyhole connection thus saves on assembly time without compromising on the quality of the mechanical fastening of the slats.

It should be understood that a "keyhole" connection is a means of fastening a first component to a second component, wherein a keyhole-shaped hole is provided in the first component and a protrusion with a flared end or head is provided on the second component. The protrusion is dimensioned to be inserted/removed through a wide portion of the hole, but not through a narrow portion of the hole.

In a preferred embodiment each slat is connected to the first chain by respective first and second keyhole connections. The first and second keyhole connections may be spaced from one another in a direction perpendicular to a conveyance direction.

In one embodiment each keyhole connection comprises a slot formed in one of the slats and a stud secured to the first chain for reception by the slot. Each stud may comprise a head and a shank, wherein each slot defines a continuous elongate opening having along a slot axis, a narrow portion having a width less than a diameter of the stud head, and a wide portion having a width wider than the stud head diameter. The slot axis of both the first and second keyhole connections may be aligned along that slat.

The invention lends itself particularly well to feederhouse elevators in combine harvesters, although it will be appreciated that the invention has wide application to other chain and slat elevators.

In accordance with a second aspect of the invention there is provided a method of assembling a chain and slat conveyor comprising the steps of:

training first and second chains around rollers or sprockets and connecting loose ends of the chains to form first and second continuous chains;

connecting a slat to a first chain by a keyhole connection; then, securing the slat to the second chain by a bolt or rivet; and then, securing further slats to the first and second chains.

BRIEF DESCRIPTION OF THE DRAWINGS

Features of the invention will become apparent from reading the following description of specific embodiments of the invention with reference to the appended drawings in which.

DETAILED DESCRIPTION OF THE INVENTION

Figure 1:
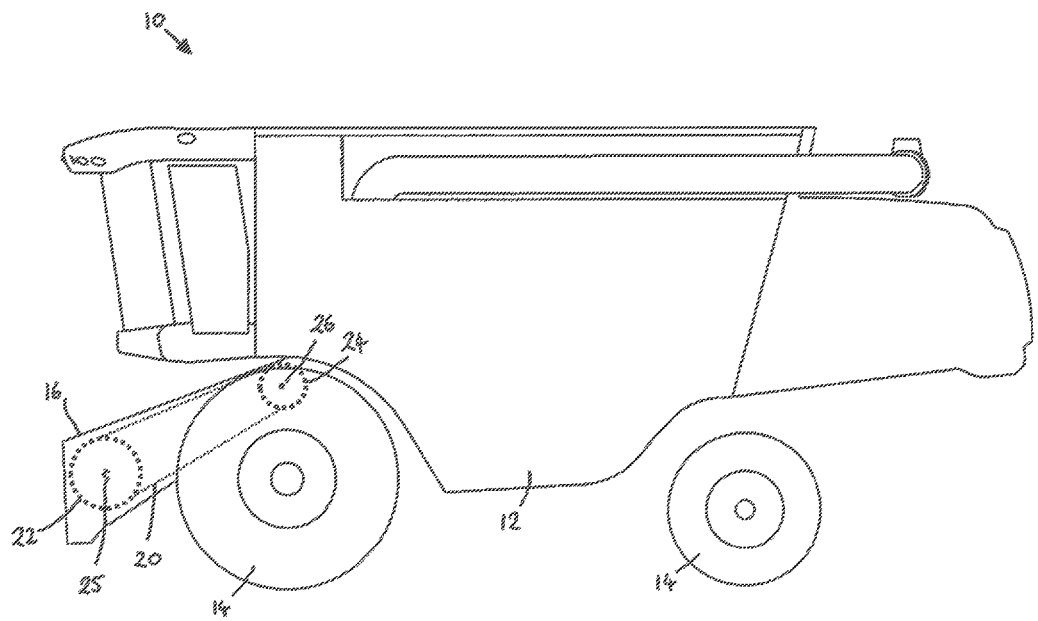
FIG. 1 is schematic side view of a combine harvester which includes a chain and slat elevator in accordance with an embodiment of the invention.

FIG. 1 shows a combine harvester 10 comprising a chassis or frame 12 supported on ground engaging wheels 14. A header (not shown) is removeably attached to the front side of feederhouse 16 which houses, in a known manner, a chain and slat conveyor or elevator 20.

The elevator 20 comprises a plurality of continuous chains, three in this example, trained around front sprockets 22 and rear sprockets 24, the sprockets being transversely spaced and supported for rotation on respective front and rear shafts 25,26. The elevator 20 serves to convey crop material in a generally rearward direction from an attached header into the body of the combine 10 for threshing, separating and cleaning in a known manner.

Figure 2:
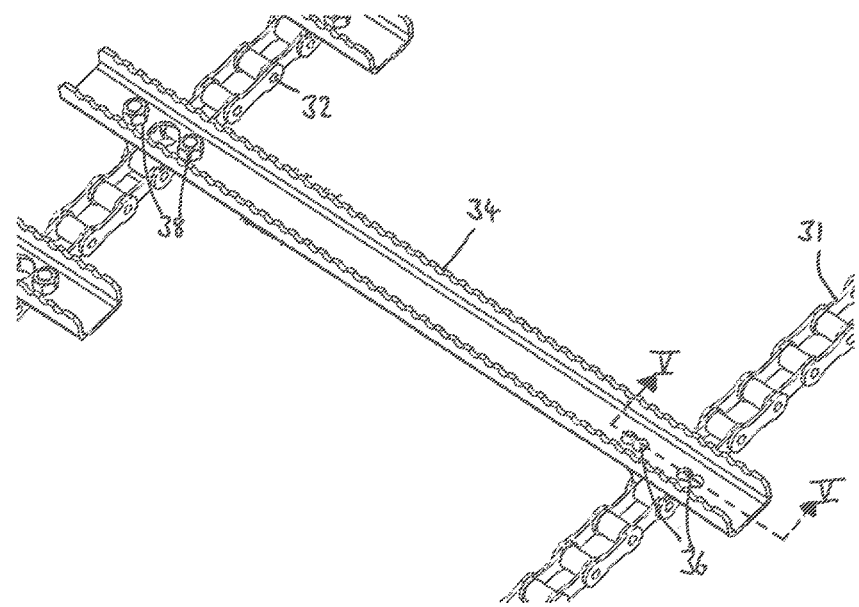
FIG. 2 shows a perspective view of part of a chain and slat conveyor in accordance with a first specific embodiment of the invention.

FIG. 2 shows part of the elevator 20 and shows first and second chains 31,32. The third chain is hidden from view. The chains 31,32 have secured therebetween a plurality of slats 34 which extend at substantially right angles to the direction of movement of the chains 31,32 and serve to sweep crop material through the feederhouse, along the floor, when passing along a lower run between the sprockets 22,24. The invention is concerned with the means employed to secure the slats 34 to the chains 31,32.

Figure 3:
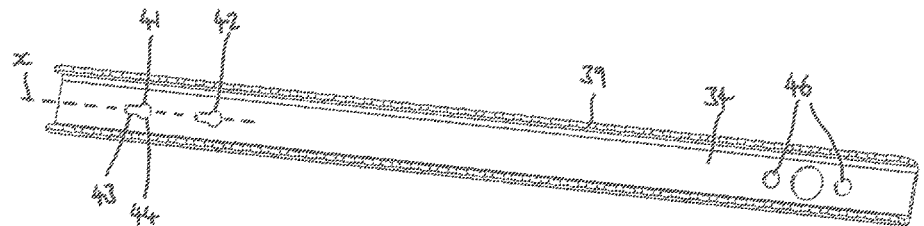
FIG. 3 shows a slat in isolation constructed in accordance with the first embodiment of the invention.

In accordance with one aspect of the invention each slat 34 is connected to the first chain 31 by a keyhole connection 36 and to the second chain 32 by bolts 38. With reference to FIG. 3 each slat 34 is constructed with a U-section profile having a toothed crop-engaging edge 39. At a first end of the slat 34 a pair of keyholes 41,42 are cut into the base of the profile.

Each keyhole shaped slot 41,42 defines a continuous elongate opening having a long slot axis x, a narrow portion 43, and a wide portion 44. In the embodiment of FIGS. 2 and 3 the keyhole slots 41,42 have a slot axis x which is aligned along the length of the slat 34.

At the opposite end of the slat 34 a pair of circular holes 46 are cut into the base of the profile.

Figure 4:
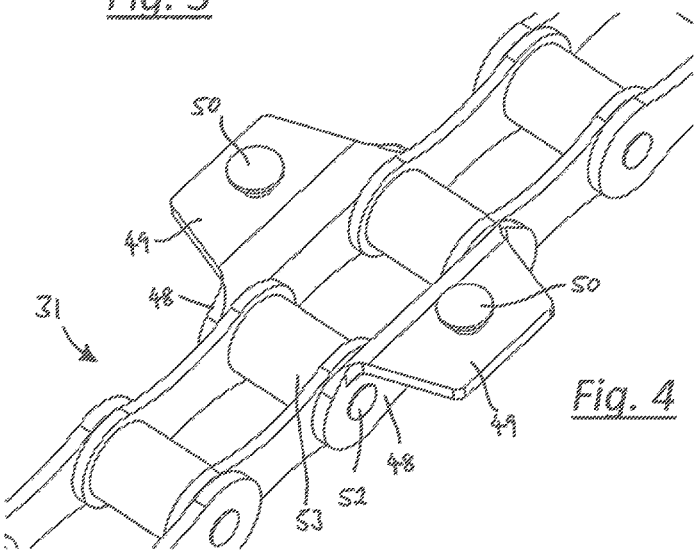
FIG. 4 shows an enlarged view of part of a chain included in the chain and slat conveyor of FIG. 2.
Figure 5:
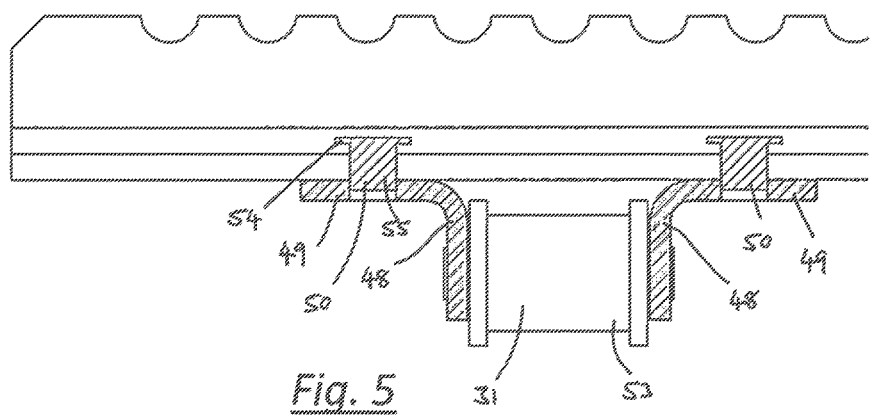
FIG. 5 shows a vertical section through the conveyor of FIG. 2 viewed along the line V-V.

With reference to FIGS. 4 and 5 the first roller chain 31 comprises pairs of brackets 48 which present upwardly facing flanges 49 from which studs 50 protrude. The brackets 48 are secured to the sides of the chain 31 by the retaining pins 52 inserted through the rollers 53.

Each stud 50 comprises a head 54 and a shank 55. The head 54 has a diameter which is wider than the narrow portion 43 of keyhole slots 41,42 but narrow enough to fit through the wide slot portion 44.

During assembly of the conveyor 20 each slat 34 is firstly attached to the first chain 31 by aligning the studs 50 with the wide portions 44 of slots 41,42 and inserting therethrough. The slat 34 is then shifted along its axis so that the studs shift to the narrow portion 43 of slots 41,42. The wide heads 54 retain the slat 34 in place. Bolts 38 are then inserted through holes 46 and corresponding brackets secured to second chain 32 and the nuts are secured.

The provision of keyhole connections 36 at one end of each slat 34 allows for easier assembly with reduced numbers of bolts to tighten. A simple shift of the slats 34 with respect to the studs 50 secures the slats 34 to the first chain 31 without any tools.

Figure 6:
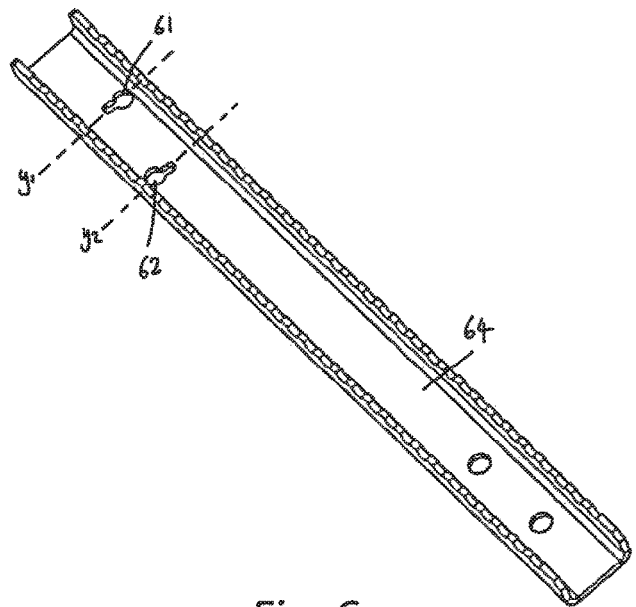
FIG. 6 shows a slat in isolation and constructed in accordance with a second embodiment of the invention, and, FIG. 7 shows an overhead view of a chain and slat conveyor in accordance with the second embodiment of the invention.
Figure 7:
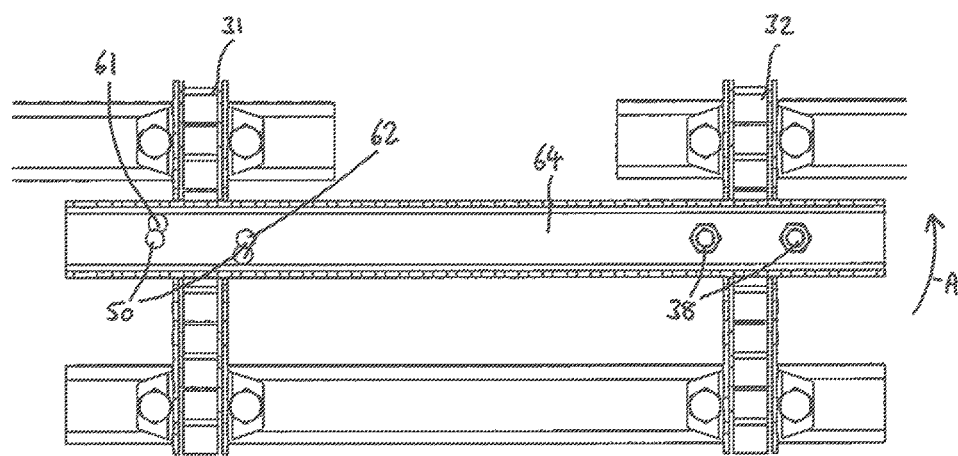

FIGS. 6 and 7 show an alternative embodiment in which a pair of keyhole slots 61,62 each have an elongate slot axis which is perpendicular to the axis of the slat 64. During assembly of such studs 50 are aligned with the wide portions of slots 61,62 before the slat 64 is rotated in the direction of arrow A so as to twist or shift the studs 50 into alignment with the narrow portions of slots 61,62 thus securing the slat 64 to first chain 31 as shown in FIG. 7. The other end of slat 64 is secured to second chain 32 by nuts and bolts 38 as in the above described embodiment.

From reading the present disclosure, other modification will be apparent to persons skilled in the art. Such modifications may involve other features which are already known in the field of chain and slat conveyors and which may be used instead of or in addition to features already described herein.

The invention claimed is:
1. A chain and slat conveyor comprising:
   first and second continuous chains; and
   a plurality of slats, wherein each slat is connected to the first chain by a keyhole connection and to the second chain by a bolt or rivet which passes through a hole in said each slat, wherein the keyhole connection comprises a keyhole formed in one of the slat and the first chain, and a stud secured to the other of the slat and first chain for reception by the keyhole, each stud comprising a head and a shank, wherein each keyhole defines a continuous elongate opening having along a slot axis, a narrow portion having a width less than a diameter of the stud head and a wide portion having a width wider than the stud head diameter, and wherein each keyhole connection comprises a keyhole formed in one of said each slat and a stud secured to the first chain, and each stud comprises a circular head spaced from the surface of an associated slat by a respective shank.

2. The chain and slat conveyor according to claim 1, wherein each slat is connected to the first chain by respective first and second keyhole connections.

3. The chain and slat conveyor according to claim 2, wherein the first and second keyhole connections are spaced from one another in a direction perpendicular to a conveyance direction.

4. The chain and slat conveyor according to claim 3, wherein the first and second keyhole connections each comprise a keyhole formed in one of said each slats and a stud secured to the first chain for reception by the keyhole.

5. The chain and slat conveyor according to claim 4, wherein the slot axes of both the first and second keyhole connections are aligned along said each slat.

6. The chain and slat conveyor according to claim 4, wherein the slot axes of both the first and second keyhole connections are aligned across said each slat, and wherein the wide portion of a first slot is located on an opposite side of the slat to the wide portion of a second slot.

7. An agricultural harvester comprising:
   a chain and slat conveyor according to claim 1;
   a chassis and a feederhouse mounted to the chassis, the feederhouse comprising a front inlet and being adapted at a front end to support a crop gathering header in a manner that places the front inlet opening adjacent to a discharge opening of the header, wherein the chain and slat conveyor is arranged inside the feederhouse for conveying collected crop rearwardly from the front inlet.

8. A method of assembling a chain and slat conveyor comprising the steps of:
   training first and second chains around rollers or sprockets and connecting loose ends of said chains to form first and second continuous chains;
   connecting a slat to the first chain by a keyhole connection; then,
   securing the slat to the second chain by a bolt or rivet; and
   securing further slats to the first and second chains, wherein each keyhole connection comprises a slot formed in one of said slats and a stud secured to the first chain, the slot defining a continuous elongate opening having, along a slot axis, a narrow portion having a width less than a diameter of a stud head and a wide portion having a width wider than the stud head diameter, wherein the step of connecting the slat to the first chain involves inserting the stud head through the wide portion of the slot and sliding the slat with respect to the first chain to move the stud towards the narrow portion of the slot.

* * * * *